United States Patent Office 3,237,473
Patented Mar. 1, 1966

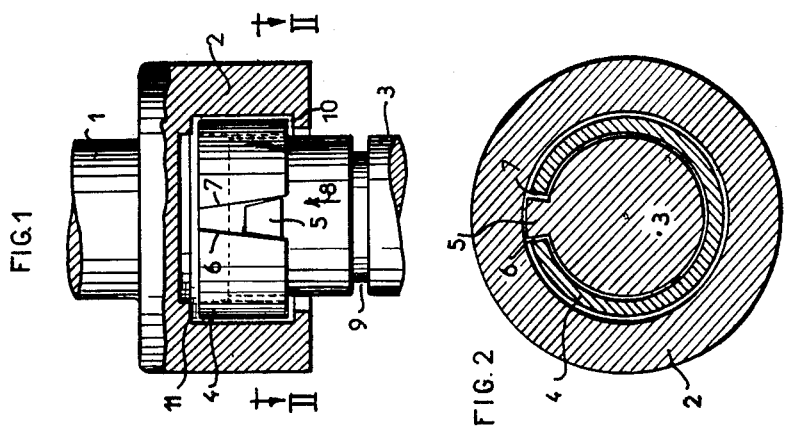
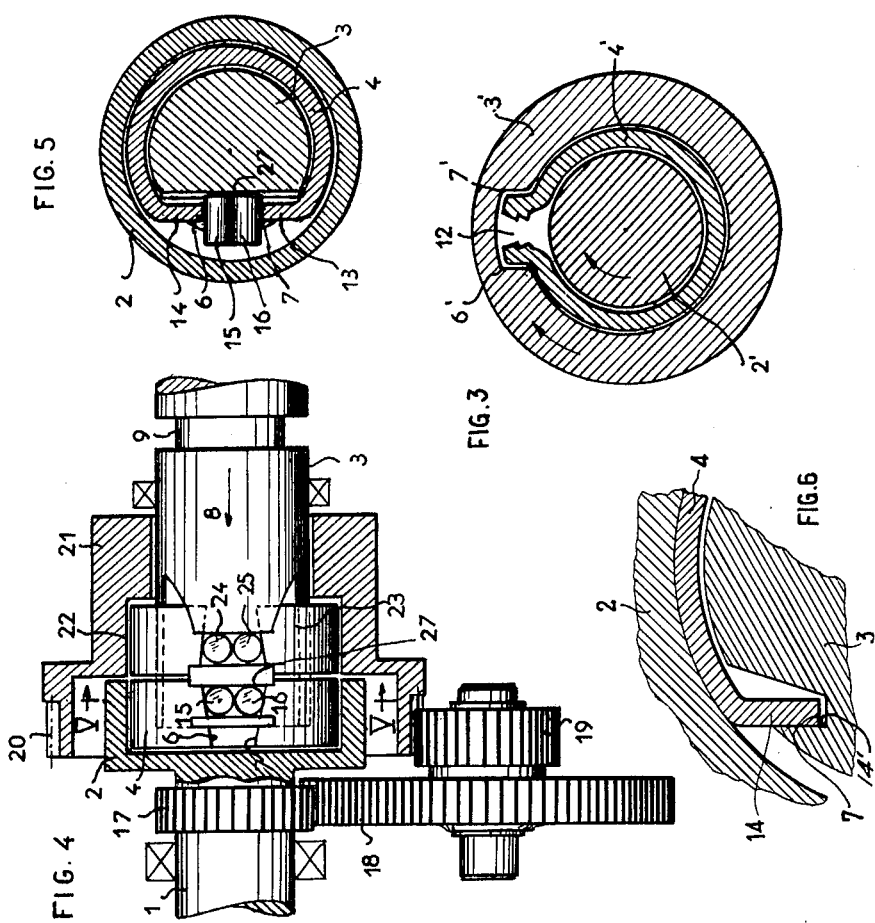

3,237,473
FRICTION-TYPE COUPLING DEVICES
Victor Wassilieff, 84 Rue de l'Assomption,
Paris 16, France
Filed June 17, 1963, Ser. No. 288,209
Claims priority, application France, June 22, 1962,
901,595
5 Claims. (Cl. 74—333)

This invention relates to a friction-type coupling device and more particularly to a cylinder-type clutch, i.e. one in which the tangential driving force is transmitted from the driving member to the driven member by an intermediate friction element which is adapted to bear against the outside or inside of a drum rigid with one of said members.

The method which consists in taking advantage of the demultiplication of the tangential forces that is obtained by winding a band or cord about a drum is commonly used for restraining rotating mechanical parts by means of so-called "binding" brakes.

It has also been proposed to apply the same method to cylindrical clutches, known as "spiral clutches," in which a spiral spring, one end of which is secured to the driving member, is freely coiled over or within a drum rigid with the driven member. When a tangential force is exerted in the desired direction on the free end of this spring, it is caused to coil up against the driven drum, thereby resulting in clutch engagement. However, this type of mechanism has certain drawbacks which have limited its use, particularly the fact that the force which must be exerted on the end of the spring to cause engagement is relatively large compared to the tangential driving force that can be transmitted. In addition, such clutches can ensure rotation only in one direction; in the other direction, they freewheel and can even be seriously damaged.

The present invention has for its object a cylindrical clutch wherein the friction element is at least angularly rigid with the driven member and wherein a control member carried on said driven member is susceptible of acting tangentially and simultaneously on both free ends of said friction element whereby to vary the spacing therebetween and hence vary the radius of curvature of said element until it is applied in frictional contact against the facing cylindrical surface of the driving member, and thus achieve the desired coupling.

In accordance with a preferred embodiment of the invention, the friction element can consist of a band coiled freely to form a split bushing placed in side a drum rigid with the driving member, while the control member can consist of a wedge-like device which is movable axially along the generatrix of the bushing, said device being supported on the driven member and being inserted between the free ends of the split bushing.

If said wedge-like part is angularly rigid with the driven member, the friction bushing can thus be rendered angularly rigid with said driven member. When the control member is moved axially and thrust between the free ends of the split bushing, the diameter thereof increases until it is applied in pressure contact against the driving drum whereby to achieve clutch engagement.

With a clutch according to the invention in the position of engagement, the drive can be transmitted in either direction of rotation indifferently. On the one hand, the torque is transmitted between the driving drum and the split bushing (or like intermediate element) by the friction of said bushing, the entire surface of which is very powerfully applied in pressure contact by the uncoiling effect of the band (without, as in the case of certain types of brakes or clutches, there being a positively engaging leading portion together with a trailing portion that does not contribute to the coupling). On the other hand, the torque is transmitted positively between the bushing and the driven member by the abutment of one or the other of the two free ends of the ring (depending on the direction of rotation) against the control member or against one or the other face of a suitable stop provided on the driven member in cases where the control member is not itself angularly rigid therewith. By reason both of the positive locking effect referred to previously and the fact that the entire frictional surface is utilized, very powerful torques can be transmitted by such a clutch.

It goes without saying that the reverse arrangement can be adopted for the various component parts of a clutch according to this invention, i.e. that the friction band can be wrapped freely about the outside of a drum rigid member, as a result of which the control member will operate simultaneously on the free ends of said band and move them towards each other, whereby to reduce the diameter of the bushing and tighten it about the driving drum.

It is preferable to choose a friction bushing made of sufficiently resilient material to ensure that the return to one of the positions (preferably the clutch released position) takes place elastically when the control member withdraws axially.

For certain applications, the control member particularly the wedge-like part referred to, can be rigid both angularly and in translation with the driven member (a shaft for example), in order to enable clutch engagement or release to be obtained by a mere axial sliding motion of the driven shaft relative to the driving drum.

In addition to the fact that it will operate indifferently in either direction of rotation, the clutch according to this invention has the advantage of requiring only very small control forces and of enabling large torques to be transmitted even when its size is restricted.

The precision and sweetness of operation of such clutches can be further improved (thereby permitting their control by low-power servo systems) if, by way of a wedge-like control member operating tangentially on the free ends of the friction elements, recourse is had to the locking and braking devices—particularly those utilizing ramps and followers.

The present invention will be apparent from the following detailed description of some specific embodiments thereof, given with reference to the accompanying drawings, which are filed by way of non-limitative examples and in which:

FIGURE 1 is a fragmentary plan view partly in elevation and partly in section of an embodiment of a clutch according to the invention;

FIGURE 2 is a sectional view taken along the line II—II of FIGURE 1;

FIGURE 3 is a sectional view, similar to that of FIGURE 2, of an alternative embodiment of the invention;

FIGURE 4 is a view partly in elevation and partly in axial section of a two-speed gearbox controlled by two clutches according to the invention;

FIGURE 5 is a sectional view taken along the line V—V of FIGURE 4; and

FIGURE 6 is a fragmentary view on an enlarged scale of the coupling device of FIGURE 5.

Referring first to the embodiment illustrated schematically in FIGURES 1 and 2, a driving shaft 1 is rigid with a cylindrical drum 2 into which is insertable a concentric driven shaft 3. An intermediate, elastic, split friction bushing 4 is housed freely within the annular space included between the inner cylindrical surface of drum 2 and the driven shaft 3. In the clutch released position shown in the figures, a certain clearance exists between the two facing cylindrical surfaces of the drum and the bushing, the latter being rendered angularly rigid with the driven shaft 3 by a wedge-like peg or stop 5 which bears against two free edges 6 and 7 of the split bushing, which edges are inclined relative to the bushing generatrix, i.e. are cut to form ramps.

When the driven shaft 3 is thrust in axially, in the direction of arrow 8, for instance by means of a fork (not shown) engaging into a groove 9, the edges 6 and 7 of the split bushing are spread apart and the bushing is flattened against the inner surface of the drum, thereby causing clutch engagement, with the drive being transmitted by the bushing to the driven shaft by abutment against the stop 5 of one or the other of edges 6 and 7, depending on the direction of rotation.

When the shaft 3 is retracted, the wedge releases and the bushing reverts elastically to its initial position, thereby uncoupling the driven shaft from the driving shaft. Suitable shoulders 10 and 11 provided in the drum 2 prevent undue axial shifting of split bushing 4.

Referring next to the embodiment illustrated schematically in radial section in FIGURE 3, the split bushing 4' provides clutch engagement by tightening about the outer surface of a drum 2' rigid with the driving shaft. The bushing is rendered angularly rigid with the driving member by two claws 6' and 7' which engage into a wedge-like spline 12. As in the case of the previous embodiment described, relative axial movement of the driven and driving members causes tightening or untightening of the bushing against the driving member and rotation of the driven member by one or the other extremities of the bushing.

In the examples described above, the intermediate friction element was represented as being a split elastic bushing which could be made of metal and covered or otherwise provided with a friction lining, but of course it will be understood that, without departing from the spirit and scope of the invention, recourse can be had to a band extending only over a fraction of a circle. Alternatively, a friction element consisting of a plurality of rigid inter-articulated shoe sections could be used.

As in the previous examples described, the simplest method of control is achieved when the driven member is slidable axially, thereby enabling the control member to be designed rigid, both angularly and in translation, with the driven member. When such a design is not feasible, the control member can be designed to be translatable with respect to the driven member and to be angularly rigid therewith. A limited degree of rotational freedom can be imparted also to the control member relative to the driven member, in which case the friction band becomes susceptible of moving angularly by a limited amount in either direction, depending on the direction of rotation, the drive being transmitted by abutment of the band against one or the other of the stops which limit its degree of freedom in rotation.

Clutches according to this invention readily lend themselves to the transmission of powerful torques, notwithstanding a possible small size, while the control force, which is already demultiplied by the wrapping effect of the bushing, can be further demultiplied by the wedging effect of the ramp-and-follower devices previously mentioned. Such an example of application is shown in FIGURES 4 and 5, which relate to dual clutches used in a two-speed gearbox.

As in the case of FIGURES 1 and 2, the mechanism comprises a driving shaft 1 rigid with a drum 2, within which is freely lodged a bushing 4 which is retained in angular rigidity with the driven shaft 3, but with a few degrees of angular freedom, at least when the bushing is in its spread position. Such retention is ensured by the extremities of the bushing, which are bent into the form of claws 13 and 14 adapted to obtain purchase in corresponding recesses 14' cut into the driven shaft (FIGURE 6). The free edges 6 and 7 of these claws are inclined relative to the generatrix of the bushing whereby to form two ramp-like profiles, as in the case of FIGURE 1, with which co-operates the control member, the function of which is to spread these edges apart tangentially in order to achieve clutch engagement. In the specific embodiment illustrated in FIGURES 1 and 5, the wedge-like control member, designated by reference numeral 5 in FIGURE 1, is replaced by two cylindrical followers 15 and 16 the axes of which are perpendicular to the axis of driven shaft 3 and which are partially engaged into a groove 27 which makes them rigid in translation with said shaft. The manner of operation of this part of the mechanism is identical to that of the clutch shown on FIGURES 1 and 2, that is to say that when driven shaft 3 is moved axially in the direction of arrow 8, the two followers 15 and 16 move in the same direction and co-operate with the free ramp-like edges 6 and 7, thereby increasing the diameter of bushing 4 and applying it against the inner surface of the drum 2. Driving shaft 1 and driven shaft 3 are thus rigidly united (thereby providing the direct drive), and the drive can be transmitted in either direction, one or the other of claws 13 and 14 coming to bear against one of the recesses 14' after an angular shift of a few degrees by the bushing 4 in one direction or the other (see FIGURE 6), while the other claw assumes a position of freedom in the other recess.

In the specific application of the invention to a two-speed gearbox, the driving shaft 1 is provided with teeth 17 which mesh with an intermediate gearwheel 18 rigid with a pinion 19 which meshes with toothed rim 20 of a sleeve 21 fitted freely over driven shaft 3. A drum 22 is machined into the sleeve 21, the diameter of which is preferably equal to that of drum 2. Within drum 22 is mounted a second split bushing type clutch 23 which permits driven shaft 3 to be made rigid with sleeve 21. This second split bushing 23 is likewise controlled by the axial movements of a pair of followers 24 and 25 which are rigid in translation with driven shaft 3; however, as is clearly shown in FIGURE 4, the free ramp-like ends of bushing 23 are inclined in the opposite direction to the free ends of the first bushing. As a result, when shaft 3 is moved axially in the direction of arrow 8, for instance by means of a fork (not shown) engaging into groove 9, the first clutch is brought into engagement as stated above, at the same time as the followers 24 and 25 allow the free ends of the bushing 23 to move towards each other, i.e. release the second clutch, thereby causing drum 22 and with it sleeve 21 to rotate freely with respect to driven shaft 3. Thus direct drive is transmitted, as indicated previously.

When shaft 3 is moved in the opposite direction to arrow 8, this movement initially releases the bushing 4 of the first clutch, so that during this time neither of the clutches is engaged, thus providing a neutral point for the gearbox; subsequently, the followers 24 and 25 spread the ends of the bushing 23 of the second clutch tangentially, thereby rendering sleeve 21 rigid with shaft 3, which shaft is then driven in second gear (at low speed in the example shown in FIGURE 4).

Such a two-speed gearbox controlled by two friction clutches according to the present invention can be used in numerous applications, particularly when great robustness allied to compactness is desired, as in washing machines for instance. The travel motion of the driven shaft involves only a very small stroke (for example 1 mm. to either side of that position of the driven shaft which corresponds to the neutral point), in conjunction with a small operating force, due to the fact that clutch engagement or disengagement is effected solely by the rolling motion of the followers on each other and on the ramps, which leads to a very great demultiplication of the axial force required for clutch engagement. This axial force can be supplied with advantage by a low-power servo-mechanism such as an electromagnet.

The compactness of the device according to this invention permits of using it for designing gearboxes with more than two gear ratios, using constant-mesh gears; alternatively, it could be used as a locking means of an element pivoting with respect to a stationary element.

It is of course to be understood that the present invention is by no means limited to the specific embodiments hereinbefore described with reference to the accompanying drawings, but that many modifications and substitutions of parts can be made by the specialist in the art to suit specific applications, without departing from the spirit and scope of the invention. By way of example, in the foregoing reference was made more particularly to clutches wherein the free extremities of the split bushing were spread apart by the longitudinal movement of the control member, but it will be manifest that the same result can be obtained by a different movement, radial for instance, of the control member, thereby permitting simple forms of design in the case of centrifugally controlled clutches.

What is claimed is:

1. A friction clutch comprising a driving member having a cylindrical internal friction surface, a driven member having a surface concentric with the cylindrical surface, said concentric surface being provided with a planar circumferential portion defining the bottom wall of a groove and two circumferentially spaced recesses adjacent the groove and intermediate the ends thereof, each of the recesses providing an abutment surface, a split spring band surrounding the concentric surface and provided with axially converging end edges and inwardly bent end portions extending in a plane substantially parallel to the bottom wall of the groove with a portion of each of the converging edges engaged in one of the recesses, respectively, the recesses having such dimensions as to allow the band to turn relative to the driven member between a position in which one of the bent end portions engages the abutment surface formed by one of the recesses and a position in which the other bent end portion engages the abutment surface formed by the other recess, wedging means positioned in the groove and between the free portions of the converging edges, and means for moving the wedging means to expand the band into frictional engagement with the cylindrical surface for transmitting torque from the driving member to the driven member when the band is in one of the two positions thereof.

2. A friction clutch comprising concentric driving and driven members, an expansible split band surrounding the driven member, said split band having mutually facing axially converging end edges, stop means for the band integral with the driven member and located between opposite torque transmitting end portions provided for the band in such spaced relation therewith as to allow slight rotation of the band relative to the driven member, wedging means engaged between the converging edges and control means operable for moving the wedging means along the converging edges for expanding or contracting the band with the expanding being effective for bringing the band into frictional engagement with the driving member and rotation of the driving member causing the rotation of the band relative to the driven member for moving one of the torque transmitting end portions into abutting contact with the corresponding stop means.

3. The friction clutch as claimed in claim 1 in which said wedging means comprises a pair of cyindrical rotatable followers, the axes of the followers being perpendicular to the axis of the driven member.

4. The friction clutch as claimed in claim 2 in which said wedging means comprises a pair of cylindrical rotatable followers, the axes of the followers being perpendicular to the axis of the driven member.

5. A gear box assemblage including a driving member, a driven member, a drum on the driving member, a sleeve on the driven member having a portion surrounding the drum, means defining a drum within the sleeve having a diameter equal to that of the drum on the driving member, gear teeth on the driving member, a gear wheel meshing with the teeth, a pinion rigid with the gear wheel, teeth on the portion of the sleeve surrounding the drum on the driving member meshing with the pinion, an expansible split band mounted within the drum on the driving member, said split band having mutually facing axially converging end edges, stop means for the band located between opposite torque transmitting end portions provided for the band in such spaced relation therewith as to allow slight rotation of the band relative to said member, wedging means engaged between the converging edges, a second expansible split band mounted within the drum on the driven member, said second band having mutually facing axially converging end edges extending in a direction opposite to the end edges of the first named split band, second stop means for the second band located between opposite torque transmtting end portions provided for the second band in such spaced relation therewith as to allow slight rotation of the second band relative to said member, second wedging means engaged between the converging edges of the second band, and control means operable to displace the driven member axially relative to the sleeve so that when the driven member is displaced in the direction of the driving member the wedging means for the converging edges of the first named band expand such band for engagement with the first named drum with the second wedge means allowing the converging edges of the second band to move toward each other so that the sleeve and second drum rotate freely relative to the driven member whereby the driving and driven members are rigidly connected to provide a direct drive while on displacement of the driven member in the opposite direction the first named wedge means allows the converging edges of the first named band to move toward each other for disengaging such band from the first named drum thus providing a neutral position with the second wedge means expanding the second band for engagement with the second drum thereby coupling the sleeve with the driven member.

References Cited by the Examiner
UNITED STATES PATENTS

| | | | |
|---|---|---|---|
| 683,169 | 9/1901 | Browning | 192—78 |
| 781,866 | 2/1905 | Austin | 192—78 |
| 1,539,720 | 5/1925 | Davenport | 192—78 |

DON A. WAITE, *Primary Examiner.*

DAVID J. WILLIAMOWSKY, *Examiner.*